Figure 1:
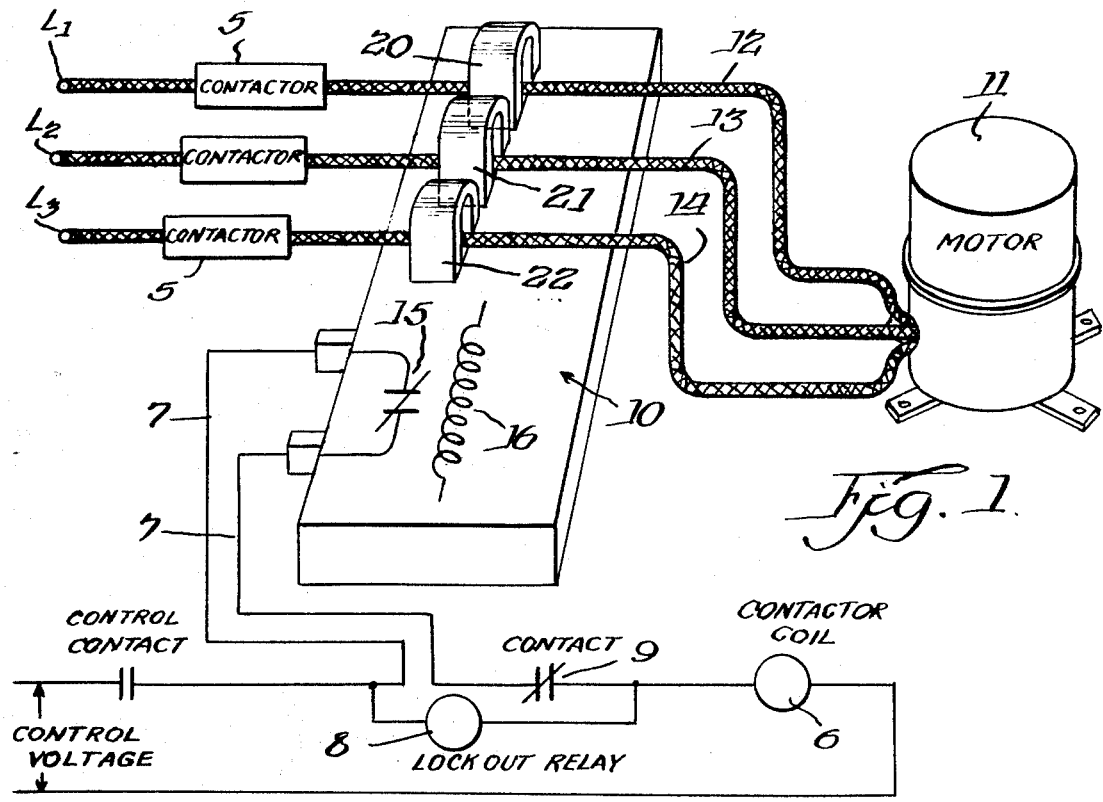

United States Patent
Walstad et al.

[15] 3,683,237
[45] Aug. 8, 1972

[54] ADJUSTABLE SOLID STATE OVERLOAD RELAY

[72] Inventors: Dennis C. Walstad, Winfield; Walter R. Knopf, Geneva, both of Ill.

[73] Assignee: Furnas Electric Company, Batavia, Ill.

[22] Filed: Dec. 9, 1970

[21] Appl. No.: 96,439

[52] U.S. Cl. .............. 317/13 R, 317/22, 317/33 SC, 317/36 TD, 317/141 S, 317/154, 336/175
[51] Int. Cl. ..................... H01h 47/18, H02h 7/085
[58] Field of Search ...... 317/13 R, 22, 33 SC, 36 TD, 317/141 S, 154; 336/175

[56] References Cited

UNITED STATES PATENTS

| | | | |
|---|---|---|---|
| 3,602,771 | 8/1971 | Walstad et al. | 317/13 R |
| 3,546,537 | 12/1970 | Jump et al. | 317/36 TD |

*Primary Examiner*—James D. Trammell
*Attorney*—Russell H. Clark

[57] ABSTRACT

Overload and other excessive current conditions as regards an electric motor for example are sensed by current sensing loops which form the primary winding of respective transformers. The voltages developed across the secondary windings are rectified and supplied to a de-energizing circuit. In accordance with the invention a plurality of adjustable potentiometers are incorporated in the said circuit in a unique manner for calibrating the circuit and for limited adjustment whereby it is possible for different magnitudes of current flowing in the conductors to the motor to cause an overload tripping of the device and an interruption in the supply of said current to thus stop operation of the motor. The trip point can be adjusted as much as twenty percent up or down to thus eliminate the problems of heaters and the necessity of stocking a different overload device for every current rating.

4 Claims, 5 Drawing Figures

Inventors.
Dennis C. Walstad &
Walter R. Knopf.
By Russell H. Clark
Atty.

Inventors:
Dennis C. Walstad, &
Walter R. Knopf
By Russell H. Clark
Atty.

ADJUSTABLE SOLID STATE OVERLOAD RELAY

The invention relates to an electronic control device which is sensitive to current flow and has reference more particularly to an adjustable overload circuit arrangement employing current sensing loops for controlling electric motors and the like.

The basic improvement which has been incorporated in the present control device resides in an arrangement of potentiometers for calibrating the system and which provides for adjustability for varying the magnitude of the current such as will cause an overload tripping of the device and an interruption in the current being supplied to the electric motor or the like. The present control device also employs current sensing loops such as shown and described in the U.S. Pat. to Walstad et al. No. 3,602,771 granted Aug. 31, 1971 and entitled Solid State De-energizer Having Current Sensing Loops. However the circuit of said co-pending application does not employ the adjustable potentiometer of the present device whereby the trip point of the device can be adjusted as much as 20 percent up or down to thus eliminate the problems of heaters or the necessity of stocking a different overload for every current rating.

One of the objects of the present invention therefore is to provide a control device of the solid state type for protecting motors and the like from overload conditions and which will employ current sensing loops as described and wherein each loop serves as a transformer core and has a built-in air gap to provide a method of calibration by allowing the primary inductance to be increased or decreased by a small amount. The air gap can be opened or closed by a screw adjustment.

Another object of the invention is to provide a control device as described which will employ current sensing loops and an electronic circuit arrangement in electrical connection with the loops for sensing an overload condition as regards current flow to the motor and which will interrupt said current flow when overload conditions exceed a preselected value and exist for a predetermined time.

Another object of the invention resides in the provision of a solid state electronic circuit for sensing overload conditions and which will incorporate a novel and unique arrangement of potentiometers for calibrating the system and for limited adjustment whereby to vary the magnitude of the current such as will cause an overload tripping of the device.

With these and various objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts.

Figure 4:
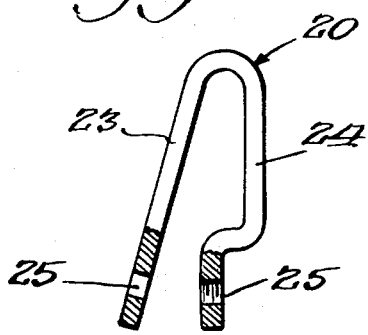
Figure 5:
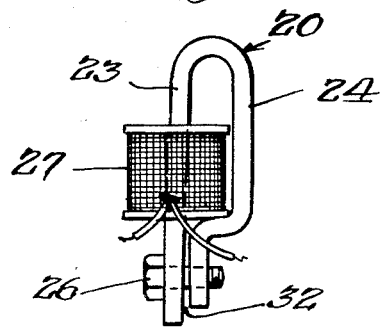
Figure 2:
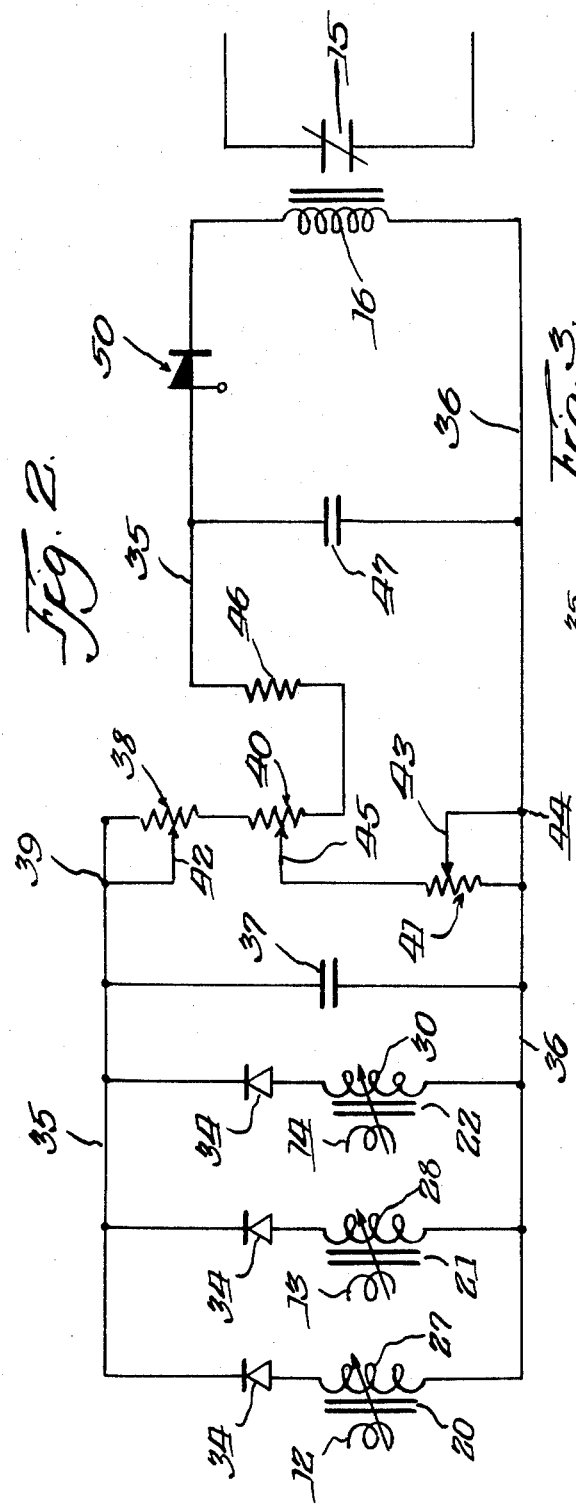
Figure 3:
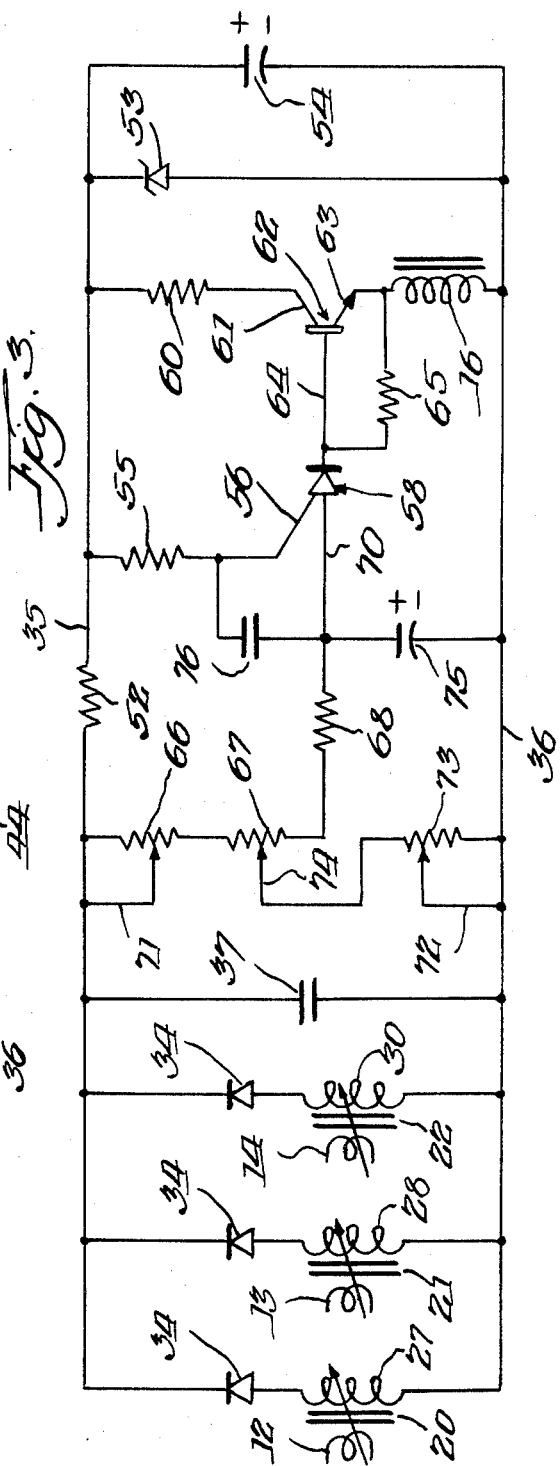

FIG. 1 is a perspective view of a control circuit arrangement for an electric motor and which incorporates the solid state, adjustable overload relay of the invention, FIG. 2 is a diagrammatic view of a solid state electronic circuit for sensing overload motor conditions and which incorporates a novel arrangement of potentiometers whereby the trip current can be varied, FIG. 3 is another diagrammatic view showing another form of electronic solid state control circuit having adjustability as regards trip current in accordance with the invention, FIG. 4 is an elevational view of one of the metal current sensing loops, and FIG. 5 is an elevational view of a current sensing loop such as shown in FIG. 4 following assembly therewith of a transformer secondary coil and adjustable closure of the air gap.

The diagrammatic circuit arrangement shown in FIG. 1 illustrates the circuit connections for the present control device 10 for controlling an electric motor such as 11. The motor may be a compressor motor such as may be used in air conditioning equipment, machine tools or conveyors and in accordance with the invention overload conditions on the motor are detected by and the motor circuit is interruped by the said control device 10. The said device uses an electronic, solid state measuring circuit such as shown in FIG. 2 or FIG. 3 to trigger an isolated relay contact 15 in the event of an overload. The trip point can be adjusted as much as twenty percent up or down to eliminate the problems of stocking a different overload for every current rating.

The conductors 12, 13 and 14 electrically connect the motor 11 to the terminals L1, L2 and L3 of a source of three phase alternating current. Switch means in the form of a contactor 5 is interposed in the conductors respectively. The coil for the normally open contactors 5 is indicated by numeral 6 in the control circuit as shown in FIG. 1. Said control circuit is energized by its own control voltage and by means of the conductors 7 the relay contact 15 is connected in the circuit. The lockout normally closed relay 8 consists of a high impedance coil and the same has the normally closed contact 9.

The contactors 5 are normally open contacts and upon a closing of the control contact in the control circuit the coil 6 will be energized to cause the contactors 5 to close and start the motor 11. The motor will continue in operation until the control contact is opened or until the coil 16 is energized causing the normally closed contact 15 to open as a result of an overload condition on the motor. Energization of the relay coil 16 as a result of an overload will momentarily deenergize the coil 6 and open the contactors 5. Since the contactors would reset immediately it is necessary to employ a series lockout relay 8 as shown in FIG. 1 to hold the contactors in an open position until they are reset following a time delay or until the contactors are set manually by the operator.

FIGS. 2 and 3 show in diagrammatic form circuit arrangements such as may comprise the control device 10 for detecting an overload current in the conductors 12, 13 and 14 and for automatically interrupting current flow to the motor 11 as a result of said overload condition. It will be observed that the conductors each pass through metal loops 20, 21 and 22 respectively and which comprise the current sensing loops of the said control device. The metal loops form the core of the transformers which sense the current flow in the said conductors. FIG. 4 shows one of the loops such as 20 which is formed of metal, preferably magnet steel, and which has a straight leg 23 and a bent leg 24. Both legs are apertured at 25 and the opening in the bent leg is threaded for receiving the threaded screw 26 as shown in FIG. 5. A secondary coil 27 is assembled on the leg 23 before the legs are joined or connected by the screw 26. The said screw renders the legs adjustable so that the air gap indicated by 32 can be varied whereby the primary inductance can be increased or decreased by a small amount.

Referring to FIG. 2, three transformers are shown for the three-phase current, and each transformer has a secondary winding indicated by numerals 27,28 and 30. The metal loops 20, 21 and 22 form the core of the transformers and wherein the primary is formed by one of the conductors 12,13 and 14 which supply the three-phase current to the motor. The conductor may pass through its loop as shown in FIG. 1, or the the conductor may have one or more turns around its loop as diagrammatically indicated in FIG. 2. Each secondary circuit includes the series connected diode 34 for rectifying the induced alternating currents and the secondary circuits are connected in parallel relation by the conductors 35 and 36 which have electrically connected thereto a combination of electric elements that sense the magnitude of the positive current pulses supplied thereto by the inductive action of the transformers.

The output of the sensing transformers is a pulsating direct current voltage which is proportional to the alternating current passing through the conductors 12,13 and 14. The said voltage is applied to the capacitor 37 connected across the conductors 35 and 36 and which acts to level off and smooth out the rectified voltages. The resistors 38, 40 and 41 provide a voltage divider and wherein the resistors 38 and 41 have a maximum and a minimum calibration setting to enable resistor 40 to give to the overload circuit arrangement a linear and accurate adjustment control. By using both 38 and 41 to calibrate the system, the overload circuit can be constructed so as to track over the adjustment range with good accuracy. It will be observed that the divider 42 connected at 39 to positive conductor 35 provides an adjustable potentiometer with the resistor 38 and also that the divider 43 likewise provides an adjustable potentiometer with the resistor element 41, the said divider being connected at 44 to negative conductor 36. The opposite terminal of resistor 41 is connected by the divider 45 to the resistor element 40 to form an adjustable potentiometer therewith.

It will thus be seen that the potentiometers 38 and 40 and the resistor element 46 are in a series connected relation with the positive conductor 35. However by reason of the divider 45 the potentiometer 41 is connected across the conductors 35 and 36 in parallel with the capacitor 47 and also in parallel with the capacitor 37. The resistor 46 provides for a delay in the charging of the capacitor 47. The resistance elements 38,40 and 41 are all inexpensive carbon controls which however are susceptible to fairly wide fluctuations in resistance with temperature and humidity changes. By using the resistance elements in the arrangement as herein described and disclosed, that is as voltage dividers, the same enables the elements to compensate each other and drift problems are substantially eliminated. The resistor 38 may have a value of 20,000 ohms, with capacitor 37 having a rating of about one half a microfarad at 100 volts and capacitor 47 having a rating of about 50 microfarads at 25 volts. Resistor 41 may have a value of 50,000 ohms and the same for resistor 40.

When the voltage on the capacitor 47 exceeds the break down voltage of the trigger diode or diac 50, then the trigger diode will close and the capacitor will discharge through the said diode and through the coil 16 previously identified. With the energization of the coil 16 the normally closed contact 15 will open and the contactor coil 6 will be de-energized to thus open the contactors 5. The trigger diode or diac is a switching device sensitive to voltage and the same remains open until about 20 volts, a normal voltage for the circuit of FIG. 2, is applied to its terminals whereupon the trigger diode or diac will close. Such a voltage represents an overload condition existing on the motor 11 and the circuit will react and automatically energize the relay coil 16 to stop the motor. Since the contact 15 is opened only momentarily it is necessary to use a series lockout relay with contact as shown in FIG. 1 to hold the contactors 5 open until manually reset or until they are closed following a predetermined time delay.

Whereas the diac is set for closing at a fixed voltage nevertheless the potentiometer 40 provides for adjustments in the setting for the overload relay device. By reason of the connection in the circuit arrangement between potentiometers 38 and 41, the control potentiometer 40 can be adjusted to vary the trip current in a linear manner while the time constant for charging the capacitor 47 will remain essentially constant.

The electronic, solid state control circuit of FIG. 3 represents an improvement over that of FIG. 2 although basically similar thereto. The circuit of FIG. 3 is characterized by the fact that it incorporates a programmable unijunction transistor. As described and explained as regards the circuit of FIG. 2, motor current passes through the conductors L1,L2 and L3 and which in turn pass through the metal loops 20, 21 and 22 of the control device. The same is diagrammatically illustrated in FIG. 3 which shows the three transformers as having secondary windings 27, 28 and 30 in circuit with the rectifying diodes 34 and all are joined in parallel relation by the conductors 35 and 36. The capacitor 37 is connected across the conductors 35 and 36 for the purpose of smoothing out the ripple in the direct current voltage which is proportional to the motor current.

The resistor 52 in the positive conductor 35 supplies current to the zener diode 53, a ten volt element and which provides a reference voltage that appears across the zener diode which as shown is connected across the conductors 35 and 36. This reference voltage is filtered by the capacitor 54 connected in parallel with the zener diode and said capacitor also acts to store energy needed to energize the relay coil 16 in the event of an overload trip. The resistor 55 connects the anode gate 56 of the programmable unijunction transistor 58 to the conductor 35 beyond the resistor 52 so that the reference voltage is applied to the anode gate. The said resistor also acts to limit the current through the anode gate when the overload circuit arrangement is caused to trip. The resistor 60 is also a current limiting element which serves to supply and limit current to the collector 61 of the transistor 62 during the said overload trips. The emitter 63 of the transistor 62 is connected to the relay coil 16 and the conductor 64 connects the unijunction transistor 58 with the transistor 62.

The circuit of FIG. 3 employs a voltage divider arrangement which is basically similar to that of FIG. 2.

The resistor 66 is connected in series relation with resistors 67 and 68, the last element namely resistor 68 being joined by conductor 70 to the anode base of the unijunction transistor 58. The divider 71 provides an adjustable potentiometer with resistor 66 which connects with the positive conductor 35. The divider 72 provides an adjustable potentiometer with the resistor element 73 which connects with the negative conductor 36. The other terminal of 73 is joined by the divider 74 to the resistor 67 to thus form an adjustable potentiometer therewith.

The resistance elements 66,67,73 and 68 provide a voltage proportional to the direct current analog voltage. This voltage is delayed by the capacitor 75 to give to the anode of the transistor 58 a signal to compare with the voltage on its anode gate 56. The purpose of the resistor 68 is to provide a time delay in the charging of the capacitor 75. The adjustable potentiometer 67 thus provides the control for setting the overload circuit device. By virtue of its connection with the calibrating potentiometers 66 and 73, the trip current will vary linearly with adjustment of 67 while the time constant for charging the capacitor 75 will remain essentially constant. Thus it can be stated that a 10 percent adjustment of 67 will give a 10 percent variation in the trip current. As previously stated in connection with FIG. 2, the resistors 66,67 and 73 are not particularly stable and changes in resistance result due to atmospheric conditions will occur. However by connecting all three in series and as voltage dividers they are able to compensate each other and drift problems are substantially eliminated. The voltage applied to the resistor 68 is fairly stable and is a definite fixed percentage, depending on the position of the divider 74, of all the direct current voltage across the capacitor 37.

The programmable unijunction transistor 58 is normally an open switch. However the same will close when the voltage on the anode 70 exceeds the voltage on the anode gate by about seven tenths of a volt. The transistor 58 will then conduct as a closed switch between anode and cathode. When 58 closes as a result of an overload current being sensed by the circuit arrangement, the charge on capacitor 75 will discharge through 58 and through the emitter 63 of the transistor 62 to the relay coil 16. This action of the transistor 62 will also discharge the capacitor 54 through the resistor 60 and also into the relay coil 16. Thus as previously explained, energization of the said coil will open the contactor 15 and current to the motor 11 will be terminated.

The function of the resistor 65 is to prevent leakage from transistor 58 from being amplified in transistor 62 and then discharging capacitor 54 prematurely. The function of the capacitor 76 is to provide a high frequency noise filtering for the unijunction transistor 58 to protect it from false triggering.

By reason of the adjustable potentiometers 40 and 67 in the circuit arrangements of FIGS. 2 and 3, the trip point of the control device can be varied as much as 20 percent up or down thus eliminating the problems of heaters and the necessity of stocking a different overload device for every current rating. With such adjustments being possible, a 20 ampere unit for example, having a normal rating of Must hold at 20 amps. A.C.
Must trip at 22.4 amps A.C.

can be adjusted to about 80 percent of its normal rating and the same would then operate at Must hold at 16 amps. A.C.
Must trip at 17.9 amps. A.C.

The same unit could be adjusted to 120 percent of its normal rating and the same would operate at Must hold at 24 amps. A.C.
Must trip at 26.9 amps. A.C.

A special calibrating know with a built in scale is provided for the device 10 and after adjustment of the overload circuit has been completed the know and scale are removed and a rating plate is placed on the cover sealing the adjusting hole and marking the overload with its rating. Setting of the overload device can be carried out by the manufacturer or by the user in his own plant.

What is claimed is:

1. In a control device for controlling the operation of an electric motor or the like, the combination with a current supply source, of main conductors connecting the current source with the motor, means including a contactor for controlling flow of said current to the motor, means for actuating the contactor including a relay coil, an electric circuit wherein said relay coil forms an element of the same, means for sensing the current flowing to the motor through said main conductors and which form the core of respective transformers having secondary windings, conductors connecting the secondary windings in parallel in said electric circuit, rectifying means in each secondary winding circuit for rectifying the alternating current voltages which are induced when current flows in the main conductors to the motor, thereby producing a rectified direct current voltage proportional thereto, a capacitor in said electric circuit connected in parallel with the secondary winding circuits and across which the direct current voltage is applied, a normally open switch element in connected relation with the capacitor, said normally open switch element being sensitive to voltage whereby it is caused to close when the said capacitor becomes charged to a predetermined maximum value, whereby said closing of the switch element causes the capacitor to discharge through the said switch element and through the relay coil, an arrangement of resistance elements having connected relation in parallel with the secondary winding circuits, certain of said resistance elements having minimum and maximum calibration settings respectively and all of said elements having a voltage divider in associated relation therewith whereby the resistance value thereof can be varied to thereby vary the magnitude of the current flowing in the main conductors to the motor such as will cause the said switch element to close, wherein the resistance elements and the voltage divider in associated relation therewith each comprise an adjustable potentiometer and which are located in advance of the capacitor and also the normally open switch element, whereby adjustment of the potentiometers will cause the said switch element to close on different values of current flowing in the main conductors to the motor, and wherein said potentiometers have a circuit connection such that the trip current will vary linearly with adjustment of the potentiometers while the time constant for charging the capacitor will remain substantially constant.

2. A control device for controlling the operation of an electric motor or the like as defined by claim 1, wherein the normally open switch element comprises a programmable unijunction transistor.

3. In a control circuit of the electronic solid state type, the combination with one or more metal loops for sensing the current flowing through main conductors passing through the loops and which form the core of respective transformers each having a secondary winding, of conductors connecting the secondary windings in parallel, rectifying means in each secondary winding circuit for rectifying the alternating current voltages which are induced when current flows in the main conductors, thereby producing a rectified direct current voltage proportional thereto, a capacitor connected across the positive and negative terminals of the control circuit and to which the direct current voltage is applied, a normally open switch element in connected relation with the capacitor, said switch element being sensitive to voltage and thereby closing when the capacitor has been charged to a predetermined maximum extent to cause the capacitor to discharge through the said switch element, a relay coil also in connected relation with the said switch element and which receives the discharge current of the capacitor from said closed switch element, an arrangement of resistance elements connected to each other and to the control circuit in advance of both the capacitor and also the normally open switch element, one of said resistance elements having a minimum calibration setting and being connected to one terminal of the control circuit, another of said resistance elements having a maximum calibration setting and being connected to the other terminal of the control circuit, all of said resistance elements having a voltage divider in associated relation therewith for rendering each one adjustable for varying the total resistance in the direct current charging circuit of the capacitor, whereby said adjustment of the resistance elements will function to vary the magnitude of the current flowing in the main conductors such as will cause the said switch element to close, and said resistance elements and their voltage dividers having a circuit connection such that the trip current will vary linearly with adjustment of the resistance elements while the time constant for charging the capacitor will remain substantially constant.

4. A control circuit as defined by claim 3, wherein the normally open switch element comprises a programmable unijunction transistor.

* * * * *